Oct. 29, 1968                F. BECK                    3,408,447
       ELECTRODE CONTROL MEANS FOR ELECTRIC ARC APPARATUS
                     Filed Sept. 3, 1965
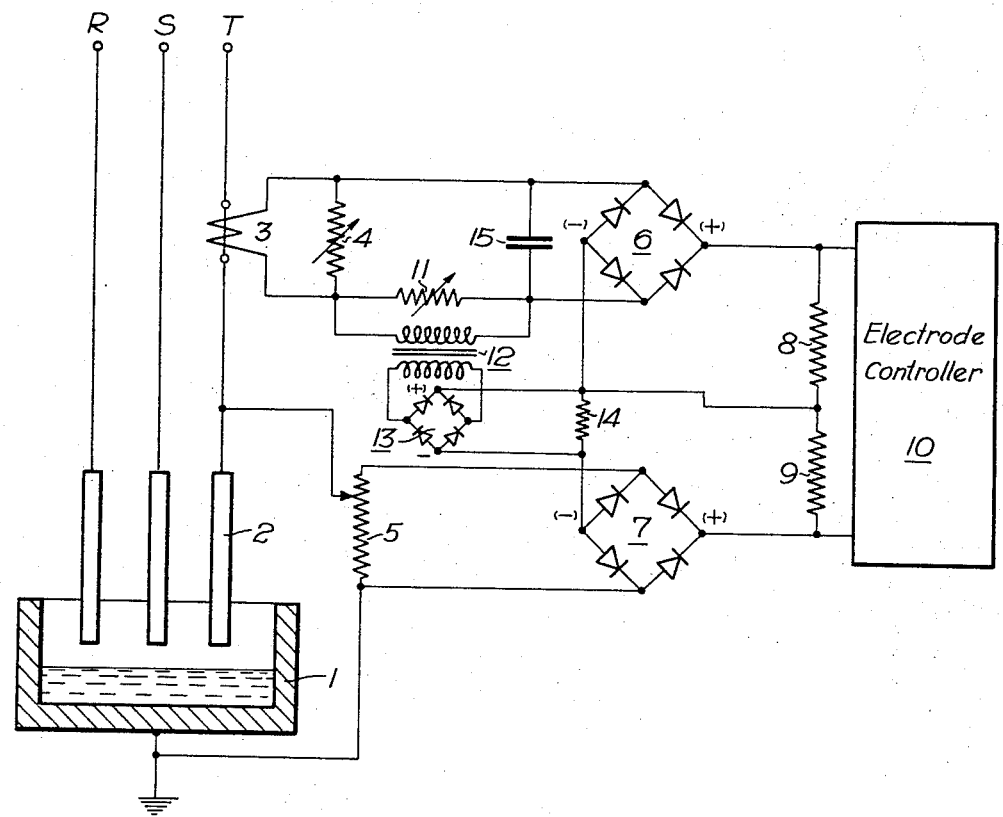
                                               INVENTOR.
                                          FERDINAND BECK
                                        BY

United States Patent Office 3,408,447
Patented Oct. 29, 1968

3,408,447
ELECTRODE CONTROL MEANS FOR ELECTRIC ARC APPARATUS
Ferdinand Beck, Vienna, Austria, assignor to Wiener Schwachstromwerke Gesellschaft m.b.H., Vienna, Austria
Filed Sept. 3, 1965, Ser. No. 484,904
Claims priority, application Austria, Sept. 8, 1964, 7,708/64
9 Claims. (Cl. 13—13)

ABSTRACT OF THE DISCLOSURE

A system and method for controlling the feed of a movable arc electrode in accordance with the actual voltage drop across the arc includes current transformer means deriving the arc current, potential transformer of the electrode and the opposite electrode, such as an arc furnace, and means for applying respective voltages corresponding to the arc current and to the output of the potential transformer means across a voltage divider. The voltage divider is connected to the input of electrode feed control means. A resistance is connected in series with the secondary of the current transformer, and a potential transformer connected across this latter resistance derives a corrective potential which is applied, in opposition to the output of the potential transformer connected to the supply conductor for the electrode, in advance of application of this potential to a section of the voltage divider. A capacitor is connected across the secondary of the current transformer to compensate for the overall inductance.

Background of the invention

This invention relates to electric arc apparatus and, more particularly, to a novel and improved method and means for controlling the position or feeding of a movable electrode or movable electrodes in arc apparatus, such as an electric arc furnace.

In electric arc furnaces, such as steel making and reducing furnaces, the position of the electrodes is usually controlled in accordance with both the electrode current and the electrode voltage, by adjusting the electrode positions until a certain relation of the electrode current and electrode voltage has been obtained. As this type of control is utilized to maintain a predetermined relation between the electrode current and the electrode voltage at a desired value, the control is usually referred to as an impedance control.

The control signals applied to the electrode feed control means or feed controllers are derived by converting the electrode current into a voltage which is proportional to the current, as by means of a current transformer. The electrode voltage is sensed between the furnace vessel and the supply conductor connected to the electrode, and at that end of the supply conductor which is nearest the current transformer. The two voltages are separately rectified and their magnitudes are compared. Generally, this comparison is effected with the aid of a voltage divider, by applying the rectified voltages in opposing relation to the two sections of the voltage divider. The resultant voltage of the voltage divider is applied to the input of the electrode control means which raises or lowers the electrode, depending upon the direction of the deviation from the desired value, by means of a positioning motor or an electro-magnetically controlled hydraulic drive.

However, measurements of the electrode voltage and the electrode current or arc current are not well suited to ascertain the resistance across the electric arc per se. Thus, in the control system just mentioned, the electrode voltage, as sensed between the supply conductor connected to the electrode and the furnace vessel, is higher than the voltage across the arc by the voltage drops in the supply conductor, the electrode, the charge in the furnace and the furnace vessel. For a stable furnace operation, however, it is essential to maintain the arc resistance at as constant a value as possible to prevent breaking of the arc. As will be understood, the arc resistance may be ascertained using the arc current and the voltage drop across the arc per se.

In addition to the resistance voltage drops mentioned above, voltage drops due to inductance arise in the furnace and in its supply conductors. These inductance voltage drops are those due to the inductance of the movable secondary conductors and to other inductances. During operation of the furnace, these inductance voltage drops result in a phase displacement between the electrode current and the electrode voltage. This phase displacement is subject to wide fluctuations during operation. For example, when melting scrap, a short circuit is often caused by a direct contact between the electrode and parts of the charge. In such instance, the electric arc is extinguished and the arc resistance has dropped to zero, with the arc current rising to a maximum. As the overall resistance is thus reduced by the arc resistance, the inductive impedance is mainly effective, resulting in a relatively large phase angle or lagging power factor.

An object of the invention is to provide a method means for obtaining an indirect measurement of the voltage drop across the electric arc per se.

Another object of the invention is to provide a method and means for deriving an indirect measurement of the voltage drop across the electric arc per se and using this measured voltage drop, together with the measured arc current, to control the position of the electrodes in an electric arc device such as an electric arc furnace.

In accordance with the invention, a system for controlling the feed movement of the electrodes in electric arc devices, such as electric arc steel making and reducing furnaces or the like, includes sensing means for sensing the electrode current and the electrode voltage. An electrode controller or control means is provided, and the input voltage of this control means is derived from a voltage divider having two sections. An auxiliary voltage, proportional to the electrode current, is applied across one section of the voltage divider, and an auxiliary voltage proportional to the electrode voltage is applied across the other section of the voltage divider in opposition to the first auxiliary voltage.

The resistance voltage drops are compensated by applying to the circuit, in opposing relation to the auxiliary voltage proportional to the electrode voltage, a correcting voltage having a value corresponding to the mean value of that component of the electrode voltage due to resistance, reduced by the voltage drop across the arc. In control systems in which the auxiliary voltage proportional to the electrode current is derived by means of a current transformer connected in the electrode supply circuit, the correcting voltage corresponding to the electrode current is derived as the output voltage of a full wave rectifier coupled by a transformer across a load resistor included in the secondary circuit of the current transformer.

In order to compensate for the overall inductance which may occur in the circuit during operation, and the resulting inductive current component, it is desirable to include a capacitor in the secondary circuit of the current transformer so that the electrode voltage component due to inductance is substantially fully compensated. As a result of these expedients, there is applied to the electrode voltage section of the voltage divider a voltage which is proportional only to the voltage across the arc per se. The resulting voltage across the voltage divider is a measure of the voltage across the arc per se.

For an understanding of the principles of the present invention, reference is made to the following description of a typical embodiment thereof as illustrated in the accompanying drawing.

In the drawing, the single figure is a schematic diagram of the invention control means as applied to a three-phase arc furnace having three electrodes.

In the drawing, the invention control system or means is illustrated as applied to only a single electrode, such as the electrode connected to phase T. However, it should be understood that similar control means are provided for the phases R and S. As illustrated in the drawing, the control system is applied between a furnace vessel 1 and an electrode 2. The electrode current is sensed by a current transformer 3 connected in the supply conductor for electrode 2. The secondary voltage of current transformer 3 is impressed across a load resistor 4, which is a rheostat or other adjustable resistance.

The electrode voltage is sensed between the transformer end of the supply conductor T connected to electrode 2 and furnace vessel 1. This electrode voltage is applied to an adjustable resistor 5, such as a tapped resistor.

A D.C. voltage proportional to the electrode current is derived by rectifier bridge network 6 connected across the load resistance 4. Similarly, a signal voltage proportional to the electrode voltage is derived by a rectifier bridge network 7 connected across the adjustable resistance 5. The auxiliary voltage at the output of rectifier bridge 6 is proportional to the electrode current, and is applied to the section, or component resistor, 8 of a voltage divider. The voltage at the output of rectifier bridge 7 is applied across the other section, or component resistor, 9 of the voltage divider. The two voltages are poled in such a manner that they act in opposition on voltage divider 8, 9. The total voltage across the voltage divider is applied to the input of an electrode control means 10 which operates, in a manner not shown in detail, the electrode positioning motor or a magnetically controlled hydraulic drive for adjusting electrode 2.

In accordance with the invention, it is desired to derive the actual voltage across the arc per se as a control signal. For this purpose, the secondary circuit of current transformer 3 includes a series resistor 11 connected in advance of rectifier bridge 6. A transformer 12 has its primary winding connected across or in parallel with adjustable resistor 11, and it will be noted that a voltage drop proportional to the electrode current is developed across resistor 11. The secondary voltage of transformer 12, which is proportional to the electrode current, is rectified by a rectifier bridge 13 connected across a secondary winding of transformer 12.

The output voltage of rectifier bridge 13 is applied across a resistor 14 which is connected in the output circuit of rectifier bridge 7. The D.C. voltage drop across resistor 14 is poled in opposition to the output voltage of rectifier bridge 7. The values of resistors 11 and 14, and the transformation ratio of transformer 12, are so selected that the voltage drop across resistor 14 corresponds to the resistance voltage drops of all the components of the furnace, such as the conductors and the like, except the actual voltage across the arc. The resistor 11 can be made adjustable in order to be able to adjust the voltage across resistance 14 in accordance with actual conditions.

It is also desirable to eliminate or compensate the inductance voltage drops in the control circuit due to the inductance of the supply conductor T connected to the electrode 2, and other inductances. For this purpose, a capacitor 15 is connected in the secondary circuit of current transformer 3 in advance of the input of rectifier bridge 6. The value of capacitor 15 is so selected that the capacitor compensates the resulting current component due to the inductance.

The auxiliary voltage drop across section or resistor 9 of the voltage divider is virtually proportional to the voltage across the arc itself. The resulting voltage across the entire voltage divider is then, with a high degree of accuracy, a measure of the resistance of the electric arc itself, so that the control system operates substantially to maintain a constant arc resistance.

While a specific embodiment of the invention has been shown and described in detail to illustrate the application of the principles of the invention, it will be understood that the invention may be embodied otherwise without departing from such principles.

What is claimed is:

1. A system for controlling the feed of a movable electrode defining one end of an arc discharge gap and having a supply conductor connected thereto, said system comprising, in combination, electrode feed control means having an input; a voltage divider connected across said input and comprising first and second sections connected in series; first means operable to apply, across said first section, a first signal potential proportional to the electrode current; second means operable to derive a second signal potential proportional to the electrode voltage between said supply conductor and a reference potential point in circuit with the other end of the arc discharge gap; third means operable to derive a corrective signal potential proportional to the electrode current and having an amplitude substantially equal to the resistance voltage drop component of such electrode voltage, less the voltage across the arc gap, under the desired operating conditions to be maintained by said feed control means; means operable to combine said second and corrective signal potentials in opposition to each other; and means operable to apply the resultant of said second and corrective signal potentials across said second section in opposition to said first signal potential.

2. A system for controlling the feed of a movable electrode defining one end of an arc discharge gap and having a supply conductor connected thereto, said system comprising, in combination, current sensing means operable to sense the electrode current; voltage sensing means operable to sense the electrode voltage between said supply conductor and a reference potential point in circuit with the other end of said arc discharge gap; a voltage divider comprising first and second component resistors connected in series; an electrode feed controller having an input connected across said voltage divider; a first transducer coupled between said current sensing means and said first component resistor and arranged to apply, to said first component resistor, a first auxiliary voltage which is proportional to the electrode current; a second transducer coupled between said voltage sensing means and said second component resistor and arranged to apply, to said second component resistor and in opposing relation to said first auxiliary voltage, a second auxiliary voltage proportional to such electrode voltage; and a correcting voltage generator arranged to generate a correcting voltage proportional to the electrode current and having an amplitude substantially equal to the resistance voltage drop component of such electrode voltage, less the voltage across the arc gap, under the desired operating conditions to be maintained by said controller; said correcting voltage generator applying said correcting voltage to said voltage divider in opposition to said second auxiliary voltage.

3. A system for controlling the feed of a movable electrode defining one end of an arc discharge gap and having a supply conductor connected thereto, said system comprising, in combination, current sensing means operable to sense the electrode current; voltage sensing means operable to sense the electrode voltage between said supply conductor and a reference potential point in circuit with the other end of said arc discharge gap; a voltage divider comprising first and second component resistors connected in series; an electrode feed controller having an input connected across said voltage divider; a first transducer coupled between said current sensing means and said first component resistor and arranged to apply, to said first component resistor, a first auxiliary voltage which is proportional to the electrode current; a second transducer coupled between said voltage sensing means and said second component resistor and arranged to apply, to said second component resistor and in opposing relation to said first auxiliary voltage, a second auxiliary voltage proportional to such electrode voltage; and a correcting voltage generator arranged to generate a correcting voltage proportional to the electrode current and having an amplitude substantially equal to the resistance voltage drop component of such electrode voltage, less the voltage across the arc gap, under the desired operating conditions to be maintained by said controller; said correcting voltage generator applying said correcting voltage to said voltage divider in opposition to said second auxiliary voltage; said first transducer comprising a current transformer; said correcting voltage generator comprising a load resistor included in the secondary circuit of said current transformer, a second transformer having its input coupled across said load resistor, and a rectifier bridge network having an input coupled to the output of said second transformer and an output coupled to said voltage divider.

4. A system for controlling the feed of a movable electrode defining one end of an arc discharge gap and having a supply conductor connected thereto, said system comprising, in combination, current sensing means operable to sense the electrode current; voltage sensing means operable to sense the electrode voltage between said supply conductor and a reference potential point in circuit with the other end of said arc discharge gap; a voltage divider comprising first and second component resistors connected in series; an electrode feed controller having an input connected across said voltage divider; a first transducer coupled between said current sensing means and said first component resistor and arranged to apply, to said first component resistor, a first auxiliary voltage which is proportional to the electrode current; a second transducer coupled between said voltage sensing means and said second component resistor and arranged to apply, to said second component resistor and in opposing relation to said first auxiliary voltage, a second auxiliary voltage proportional to such electrode voltage; and a correcting voltage generator arranged to generate a correcting voltage proportional to the electrode current and having an amplitude substantially equal to the resistance voltage drop component of such electrode voltage, less the voltage across the arc gap, under the desired operating conditions to be maintained by said controller; said correcting voltage generator applying said correcting voltage to said voltage divider in opposition to said second auxiliary voltage; said first transducer comprising a current transformer; said correcting voltage generator comprising a load resistor included in the secondary circuit of said current transformer, a second transformer having its input coupled across said load resistor, and a rectifier bridge network having an input coupled to the output of said second transformer and an output coupled to said voltage divider; said electrode being included in a circuit having a distributed inductance; said current transformer secondary circuit including a capacitor dimensioned and arranged to compensate a major portion of that component of the secondary current of said current transformer which is due to said distributed inductance.

5. A system for controlling the feed of the movable electrode defining one end of an arc discharge gap and having a supply conductor connected thereto, said system comprising, in combination, a current transformer connected in said supply conductor to derive a first signal potential proportional to the electrode current; means connected to said supply conductor and operable to derive a second signal potential proportional to the electrode voltage between said supply conductor and a reference potential point in circuit with the other end of the arc discharge gap; electrode feed control means having an input; a voltage divider connected across said input and comprising first and second component resistors connected in series; means operable to apply said first signal potential across first component resistor; means operable to apply said second signal potential across said second component resistor in opposition to said first signal potential; means, including a third resistor connected in series in the secondary circuit of said current transformer, operable to derive a corrective signal potential proportional to the electrode current and having an amplitude substantially equal to the resistance voltage drop component of such electrode voltage, less the voltage across the arc gap, under the desired operating conditions to be maintained by said feed control means; and means operable to apply said corrective signal to said voltage divider in opposition to said second signal potential.

6. A system for controlling the feed of the movable electrode defining one end of an arc discharge gap and having a supply conductor connected thereto, said system comprising, in combination, a current transformer connected in said supply conductor to derive a first signal potential proportional to the electrode current; means connected to said supply conductor and operable to derive a second signal potential proportional to the electrode voltage between said supply conductor and a reference potential point in circuit with the other end of the arc discharge gap; electrode feed control means having an input; a voltage divider connected across said input and comprising first and second component resistors connected in series; means operable to apply said first signal potential across first component resistor; means operable to apply said second signal potential across said second component resistor in opposition to said first signal potential; means, including a third resistor connected in series in the secondary circuit of said current transformer, operable to derive a corrective signal potential proportional to the electrode current and having an amplitude substantially equal to the resistance voltage drop component of such electrode voltage, less the voltage across the arc gap, under the desired operating conditions to be maintained by said feed control means; means operable to apply said corrective signal to said voltage divider in opposition to said second signal potential; said electrode defining one end of an arc discharge gap and having inductance; and a capacitor connected across the secondary circuit of said current transformer and having dimensions such as to compensate a major portion of that component of the secondary current of said current transformer which is due to said distributed inductance.

7. A system for controlling the feed of a movable electrode being included in a circuit having a distributed ing a supply conductor connected thereto, said system comprising, in combination, a current transformer connected in said supply conductor; a first resistance connected across the secondary of said current transformer to derive a first signal potential proportional to the electrode current; a first rectifier bridge network connected across said first resistance; electrode feed control means having an input; a voltage divider connected across the input of said feed control means and including first and second component resistors connected in series; means connecting the output of said first rectifier bridge network across said first component resistor; a second resistance connected between said current conductor and a reference potential point in circuit with the other end of the arc discharge gap to derive a second signal potential proportional to the electrode voltage; a second rectifier bridge network connected across the output of said second resistance; means applying the output of said second rectifier bridge network across said second component resistor in opposition to the output of said first rectifier bridge network; a third resistance connected in series in the secondary circuit of said current transformer; a transformer having a primary winding connected across said third resistance; a third rectifier bridge network connected across the secondary of said second transformer; a fourth resistance connected in the output of said second rectifier bridge network; and means applying the output of said third rectifier bridge network across said fourth resistance in opposition to the output of said second rectifier bridge network.

8. A system for controlling the feed of a movable electrode defining one end of an arc discharge gap and having a supply conductor connected thereto, said system comprising, in combination, a current transformer connected in said supply conductor; a first resistance connected across the secondary of said current transformer to derive a first signal potential proportional to the electrode current; a first rectifier bridge network connected across said first resistance; electrode feed control means having an input; a voltage divider connected across the input of said feed control means and including first and second component resistors connected in series; means connecting the output of said first rectifier bridge network across said first component resistor; a second resistance connected between said current conductor and a reference potential point in circuit with the other end of the arc discharge gap to derive a second signal potential proportional to the electrode voltage; a second rectifier bridge network connected across the output of said second resistance; means applying the output of said second rectifier bridge network across said second component resistor in opposition to the output of said first rectifier bridge network; a third resistance connected in series in the secondary circuit of said current transformer; a transformer having a primary winding connected across said third resistance; a third rectifier bridge network connected across the secondary of said second transformer; a fourth resistance connected in the output of said second rectifier bridge network; means applying the output of said third rectifier bridge network across said fourth resistance in opposition to the output of said second rectifier bridge network; said electrode being included in a circuit having a distributed inductance; and a capacitor connected across the secondary circuit of said current transformer and dimensioned to compensate a major portion of that component of the secondary current of said current transformer which is due to said distributed inductance.

9. A method of controlling the feed of a movable electrode defining one end of an arc discharge gap and having a current conductor connected thereto, said method comprising the steps of deriving a first signal potential proportional to the electrode current; deriving a second signal potential proportional to the electrode voltage between the supply conductor and a reference potential point in circuit with the other end of the arc discharge gap; deriving a corrective signal potential proportional to the electrode current and having an amplitude substantially equal to the resistance voltage drop component of such electrode voltage, less the voltage across the arc gap, under the desired operating conditions to be maintained; combining said second and corrective signal potentials in opposition to each other to derive a fourth signal potential; combining said first and fourth signal potentials in opposition to each other to derive a control potential; and utilizing said control potential to control the feed of the movable electrode.

References Cited

UNITED STATES PATENTS 2,809,319  10/1957  Steele et al. _____ 13—13 X

BERNARD A. GILHEANY, *Primary Examiner.*

R. N. ENVALL, *Assistant Examiner.*